(12) United States Patent
Ishibashi et al.

(10) Patent No.: US 7,030,838 B1
(45) Date of Patent: *Apr. 18, 2006

(54) IMAGE OBSERVATION APPARATUS

(75) Inventors: Kenji Ishibashi, Izumi (JP); Yasushi Kobayashi, Moriguchi (JP); Yasumasa Sugihara, Hashimoto (JP); Yasushi Tanijiri, Sakai (JP); Hideki Nagata, Sakai (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 260 days.

(21) Appl. No.: 08/988,537

(22) Filed: Dec. 10, 1997

(30) Foreign Application Priority Data

Dec. 10, 1996 (JP) .............................. 8-329447
Dec. 10, 1996 (JP) .............................. 8-329449
Dec. 11, 1996 (JP) .............................. 8-330668

(51) Int. Cl.
*G09G 5/00* (2006.01)

(52) U.S. Cl. ............................ 345/8; 345/211; 359/630
(58) Field of Classification Search ..................... 345/7, 345/8, 9, 211; 359/630, 631
See application file for complete search history.

(56) References Cited

U.S. PATENT DOCUMENTS 3,812,489 A * 5/1974 Hirano et al. ............... 345/211
4,979,641 A * 12/1990 Turner .......................... 222/25
5,081,449 A * 1/1992 Kurosu et al. ............... 345/115
5,138,354 A 8/1992 Okada et al.
5,200,774 A 4/1993 Nakajima
5,315,339 A 5/1994 Hamada et al.
5,388,990 A 2/1995 Beckman
5,579,026 A * 11/1996 Tabata ........................... 345/8
5,635,948 A 6/1997 Tonosaki
5,825,340 A * 10/1998 Torizuka et al. ................ 345/8
5,844,530 A * 12/1998 Tosaki ............................ 345/8
6,124,843 A * 9/2000 Kodama ..................... 345/145

FOREIGN PATENT DOCUMENTS

JP          3-56923         3/1991
JP          08-098112 A     4/1996

* cited by examiner

*Primary Examiner*—Amr Awad
(74) *Attorney, Agent, or Firm*—Burns, Doane, Swecker & Mathis, L.L.P.

(57) ABSTRACT

An image observation device which is so arranged that a user can look an image in through an ocular window thereof with the device being fitted to the user's head for example, that the image changes in linkage with movement of the user's head, and that unnecessary change of the image is prevented during the observation. The image observation device includes an eye access detector for detecting whether the user's eyes approach thereto or not, and includes, a controller by the operation of which the image changes in linkage with movement of the user's head only if the eye access detector detects that the user's eyes approach thereto, and by the operation of which the image does not change in linkage with movement of the user's head if the eye access detector does not detect that the user's eyes approach thereto.

26 Claims, 11 Drawing Sheets

Fig.13

- #201 START OF IMAGE OBSERVATION
- #202 INTERLOCKING SWITCH ON ?
  - NO → #210 WAITING FOR A PREDETERMINED TIME
  - YES → #203
- #203 START OF INTERLOCKING
- #204 OPERATION PART OPERATED ?
  - YES → #211 STOP OF INTERLOCKING
  - NO → #205
- #205 IMAGE OBSERVATION IS OVER ?
  - YES → #209
  - NO → #206
- #206 INTERLOCKING SWITCH OFF ?
  - NO → #204
  - YES → #207
- #207 STOP OF INTERLOCKING
- #208 IMAGE OBSERVATION IS OVER ?
  - NO → #202
  - YES → #209
- #209 IMAGE OBSERVATION IS OVER
- #211 STOP OF INTERLOCKING
- #212 WAITING FOR A PREDETERMINED TIME
- #213 OPERATION PART OPERATED ?
  - YES → #212
  - NO → #203

IMAGE OBSERVATION APPARATUS

BACKGROUND OF THE INVENTION

1. Field of the Invention

The present invention relates to an image observation apparatus for observing an image which a user observes by looking in through an ocular window (or eyepiece window) with the apparatus being held by a hand of the user or being fitted to a head of the user.

2. Description of the Related Arts

As this type of image observation apparatus, there has been conventionally proposed an image observation apparatus which has an image forming apparatus such as a camera or a computer graphic device, and an image observation apparatus body that is used in connection with the image forming apparatus. By constructing the image observation apparatus, in which the camera is used as the image forming apparatus, so that the camera is mounted on an image-taking direction controller which controls its image-taking direction of the image forming apparatus responsive to the posture (i.e. position and direction) of the image observation apparatus body, or by constructing the image observation apparatus, in which the computer graphic device is used as the image forming apparatus, so that its image data are processed or controlled responsive to the posture (i.e. position and direction) of the image observation apparatus body, the direction or orientation of the image can be changed in response to the movement of the user's head. With the system of image observation apparatus, the user can obtain a feeling as if the user himself or herself is present in the image while observing the image.

In order to realize the above function of the image observation apparatus, posture detecting means such as a position detecting sensor or an angular velocity detecting sensor, for detecting the position or direction of the user's head may be installed in the image observation apparatus body, and at the same time control means for controlling the image forming apparatus in response to the detecting signal transmitted from the posture detecting means may be installed on the side of the image observation apparatus body or on the image forming apparatus.

However, the present applicant finds out the following points. That is, the image observation apparatus body with the above mechanism generates or emits the detecting signal even when the user is going to observe a particular image with the image observation apparatus body in his or her hand, or even when the user is going to stop or terminate observing the particular image and to put the image observation apparatus body away from his or her eyes. Therefore, under these situations, the image is unnecessarily changed in response to the movement of the image observation apparatus body.

According to the above image observation apparatus, the image-taking direction is changed rapidly, so that there is a possibility that the durability of the image-taking direction controller may be impaired. Also, in case that a computer is used as the image forming apparatus, errors may be accumulated one after another as operation process is carried out many times. As a result thereof, there may arise a possibility of malfunction that the direction of image is not aligned with the direction of the user's head to which the image observation apparatus body is fitted, at time of resumption of observation.

Also, as this type of image observation apparatus, there has been conventionally proposed an image observation apparatus which has an image forming apparatus such as a camera or a computer graphic device, and an image observation apparatus body that is used in connection with the image forming apparatus, in which the image can be controlled by remotely operating the image forming apparatus from the side of the image observation apparatus body. For example, in case that a camera is used as the image forming apparatus, the camera is so constructed that the image-taking direction of the camera as well as the focal length and focal point of the photographing lens are adjustable so as to be able to control them remotely from the side of the image observation apparatus body. Alternatively, in case that a computer graphic device is used as the image forming apparatus, the computer graphic device is constructed so as to be able to control the operation process of image data from the side of the image observation apparatus body.

However, the present applicant finds out the following points. That is, according to the mechanism of the image observation apparatus, in case that the image condition remains the same as the image condition at time of the end of observation when the user restarts observation after the user stops the observation, and, for example, in case that the user tries to pursuit an object moving about on a wide area for monitoring the object by remotely controlling the image-taking direction of the camera as well as the focal length of the photographing lens, the user can not recognize the position and direction of the image if the image-taking direction (i.e. photographing direction) of the camera is not kept constant or stationary at time of resumption of observation. Also, under such a situation, if the focal length of the photographing lens is on the telephoto side, and if the angle of visibility is narrow, it would be difficult to correctly catch the image of the subject.

Such problems are caused by the fact that the image-taking direction of the camera as well as the focal length of the photographing lens are not kept constant at time of termination of observation so that the user can not immediately understand the condition of the image when the user resumes observation. Also, in case that a computer is used as the image forming apparatus, and in case that the image state is not kept constant at time of restarting observation, there would arise a similar problem that the user can not recognize the condition of the image at once.

Further, the present applicant also finds out the following points. That is, in case that the image observation apparatus body is equipped with an operational part for the user to remotely operate the image forming apparatus, any slight movement of the image observation apparatus body during operation of the operational part by the user is detected by posture detecting means. As a result, the image forming apparatus is unintentionally controlled against the intention of the user. That is, there is a possibility that the image under observation may swing, flutter or move along with movement of the user's hand during operation or handling of the image observation apparatus body.

SUMMARY OF THE INVENTION

A primary object of the present invention is to provide an image observation apparatus which is easy to use.

Accordingly, it is an object of the present invention to provide an image observation apparatus in which the image is prevented from changing or moving carelessly or unintentionally when the user operates or handles the main body of the image observation apparatus manually.

It is another object of the present invention to provide an image observation apparatus in which the image is prevented from being changed or moved when the user does not observe the image, even if the image observation apparatus body is moved.

It is still another object of the present invention to provide an image observation apparatus in which the image that is formed on the side of the image forming apparatus is remotely controlled by the image observation apparatus body, and in which the problem that the user can not understand the image condition at time of restarting observation is resolved.

In accomplishing these and other objects of the present invention, according to a first aspect thereof, there is provided an image observation apparatus comprising: a main body which has an image display device; an operational member which is provided on the main body and which is operated manually in order to give an instruction to the image observation apparatus; a detector for detecting a posture of the main body; and a controller for controlling an image which is displayed on the image display device in response to a signal which is output from the detector, wherein the controller stops controlling the image which is displayed on the image display device when the operational member is operated.

According to the mechanism, the image being displayed on the image display device is not controlled by the controller while the user operates the operational member. That is, even if the main body is moved, swung or fluttered while the user handles or operates the operational member manually, the image displayed on the image display device is not moved, swung, fluttered or blurred. Therefore, the image displayed thereon is surely prevented from changing carelessly or unintentionally when the user operates or handles the main body, having the operational member, of the image observation apparatus.

In the mechanism, the image observation apparatus may further comprise an image forming device such as a camera, a computer graphic device, etc. which forms the image which is displayed on the image display device. In case that the image forming device is the camera, the controller may control the image which is displayed thereon by controlling a posture of the camera.

In the mechanism, the controller may control the image which is displayed on the image display device by operating image data which are output from the image forming device.

In the mechanism, the operational member may be a member for adjusting at least one of the posture, a focal length and a focus of the camera.

In accomplishing these and other objects of the present invention, according to a second aspect thereof, there is provided an image observation apparatus comprising: a main body which has an image display device; a first detector which is provided in the main body and which detects that a user observes an image being displayed on the image display device; a second detector which detects a posture of the main body; a controller which controls the image being displayed on the image display device in response to a signal which is output from the second detector; wherein the controller stops controlling the image being displayed on the image display device when the first detector detects that the user does not observe the image being displayed on the image display device.

According to the mechanism, the controller controls the image which is displayed on the image display device, only if the first detector detects the condition or state in which the user observes the image being displayed on the image display device. In other words, the image is not changed if the user does not observe the image which is displayed on the image display device. Therefore, the image on the image display device is prevented from being changed while the user does not observe the image thereon, even if the main body of the image observation apparatus is moved.

In the mechanism, the image observation apparatus may further comprise an instruction device for allowing and prohibiting a control of the image by the controller, wherein the controller controls the image being displayed on the image display device, only when the first detector detects that the user observes the image on the image display device and only when the control of the image by the controller is allowed by the instruction device. With the mechanism, whether the control of the image displayed on the image display device is carried out by the controller or not can be decided by the user's intention. Therefore, the user can intentionally stop the change of the image on the image display device, if necessary.

In the mechanism, it is preferable that the first detector detects whether the user observes the image on the image display device or not before the control of the image by the controller is allowed by the instruction device. With the mechanism, the image which is displayed on the image display device is surely prevented from changing, when the instruction device is merely handled or operated. That is, it is possible to prevent the image on the image display device from changing while the user is not ready for observing the image thereon after operating the instruction device.

In the mechanism, it is preferable that when the first detector detects that the user does not observe the image on the image display device, first, the instruction device allows the control of the image by the controller, next, the first detector detects that the user observes the image on the image display device, and next, the controller starts to control the image on the image display device after a predetermined time lapses. The predetermined time is, for example, set to 1 or 2 seconds. With the predetermined time lag, even if the user operates the instruction device before the user's eyes are approached to the main body, the controller does not control the image on the image display device before the user is ready for the observation of the image thereon.

In the mechanism, the image observation apparatus may further comprise a camera which forms the image which is displayed on the image display device, wherein the controller controls the image which is displayed on the image display device by controlling a posture of the camera.

In the mechanism, the image observation apparatus may further comprise an operational member which is a member for adjusting at least one of the posture, a focal length and a focus of the camera.

In the mechanism, the image observation apparatus may further comprising an image generating device, including the camera, a computer graphic device, etc., which generates the image being displayed on the image display device, wherein the controller controls the image which is displayed on the image display device by operating image data which are output from the image generating device.

In accomplishing these and other objects of the present invention, according to a third aspect thereof, there is provided an image observation apparatus comprising a main body which has an image display device; a controller for controlling the image observation apparatus; and a first detector for detecting that a user stops observing an image which is displayed on the image display device, wherein the controller sets at least one setting condition of the image observation apparatus to a predetermined condition when the first detector detects that the user stops observing the image.

In the mechanism, the image observation apparatus may further comprise a camera which forms the image being displayed on the image display device, wherein the predetermined condition includes at least one of a condition for a posture of the camera, a condition for a focal length thereof, and a condition for a focus thereof. With the mechanism, because at least one of the condition for the posture of the camera, the condition for the focal length thereof, and the condition for the focus thereof is constant, the user's confusion at time of starting the next observation is reduced or lessened. Alternatively, if all of the above conditions are constant, the user's confusion at time of starting the next observation is more effectively reduced or lessened.

In the mechanism, it is preferable that the image observation apparatus further comprises a rest on which the main body is put, wherein the first detector detects whether the main body is put on the rest or not. With the mechanism, when the user puts the main body on the rest and when the first detector detects that the main body is put on the rest after finishing the observation of the image which is displayed on the image display device, the various conditions of the image observation apparatus are initialized. Therefore, when the user takes up the main body by hand for restarting to observe the image which is displayed on the image display device, the user can always restart observing the image which is produced or generated on the basis of constant conditions thus initialized.

In the mechanism, the main body may comprise an operational member for controlling the camera. With the mechanism, the user can operate the camera at hand.

In the mechanism, the image observation apparatus may comprise a second detector for detecting a posture of the main body, wherein the controller controls the image being displayed on the image display device, based upon a detecting signal which is output from the second detector.

In the mechanism, it is preferable that the controller resets a parameter, for controlling a display of the image being displayed on the image display device on a basis of the detecting signal from the second detector, into a predetermined value, when the first detector detects that the user stops observing the image.

According to the mechanism, the user's confusion at time of starting the next observation is reduced or lessened with the same reason described above.

BRIEF DESCRIPTION OF THE DRAWINGS

These and other objects and features of the present invention will become clear from the following description taken in conjunction with the preferred embodiments thereof with reference to the accompanying drawings, in which:

FIG. 13 is a flow chart showing a control method of the image observation apparatus according to the third embodiment.

DETAILED DESCRIPTION OF THE PREFERRED EMBODIMENTS

Figure 1:
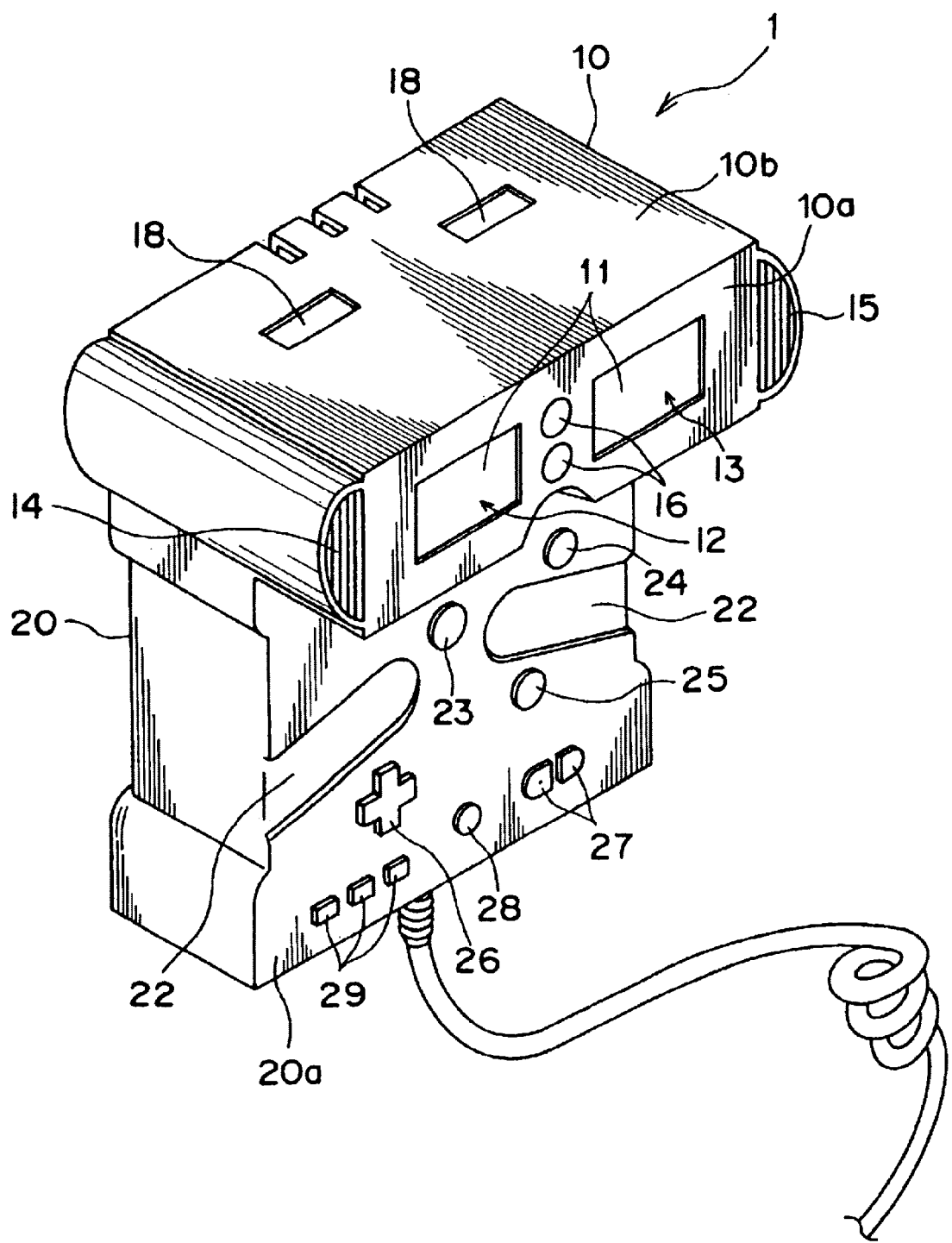
FIG. 1 is a perspective view showing an appearance of an image observation apparatus body according to a first embodiment of the present invention.

Before the description of the present invention proceeds, it is to be noted that like or corresponding parts are designated by like reference numerals throughout the accompanying drawings.

Referring to FIGS. 1 through 13, a description is made below on image observation apparatuses according to a first, second, and third embodiment of the present invention.

First, referring to FIGS. 1 through 7, the description is made below on the image observation apparatus according to the first embodiment.

The image observation apparatus is so constructed that a camera as a part of an image forming apparatus is connected to an image observation apparatus body, where the camera is attached to an image-taking direction controller for adjusting the image-taking direction thereof or the direction in which the photo is taken.

FIG. 1 is a perspective view showing an appearance of this image observation apparatus body 1. The image observation apparatus body 1 comprises an ocular part 10 and an operation part 20, each of which is formed into a generally rectangular solid shape. The image observation apparatus body 1 is formed into a generally T shape in its side view.

Figure 3:
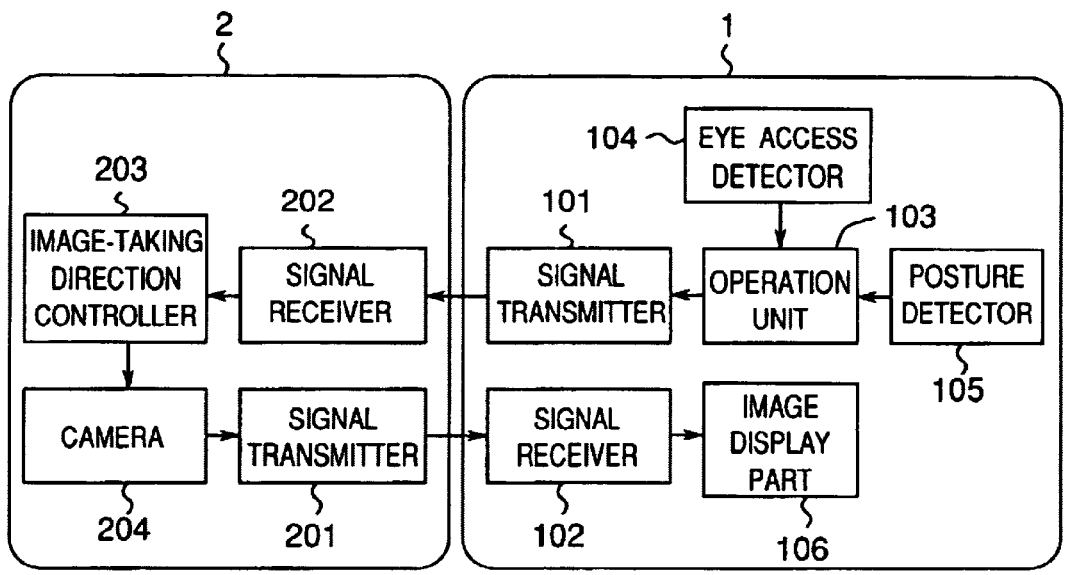
FIG. 3 is a block diagram showing a control system for an image observation apparatus in which a camera is used as an image forming apparatus which is connected to the image observation apparatus body of FIG. 1.
Figure 4:
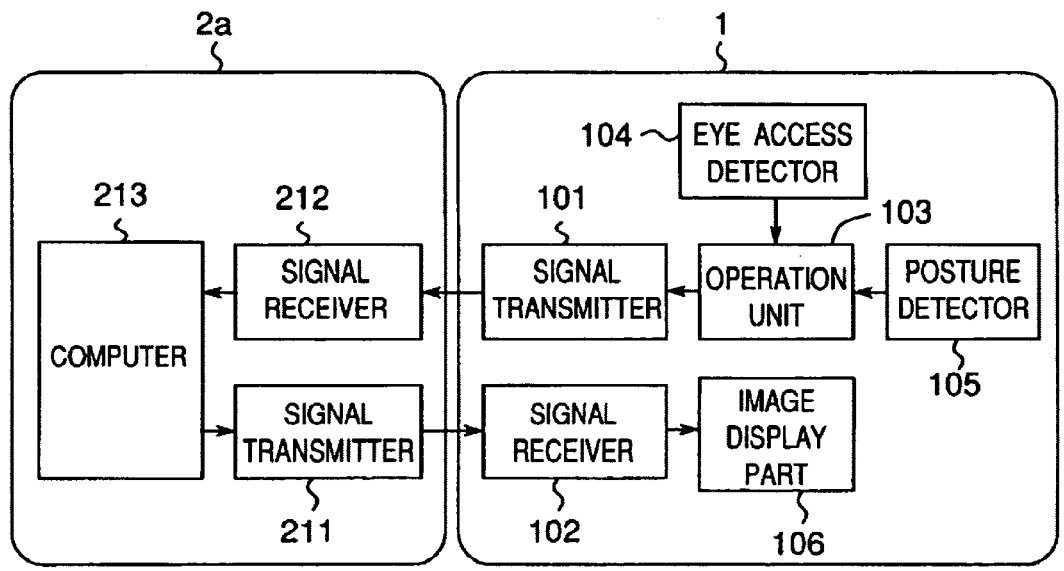
FIG. 4 is a block diagram showing a control system for an image observation apparatus in which a computer is used as an image forming apparatus which is connected to the image observation apparatus body of FIG. 1.

In an ocular surface boa of the ocular part 10, a pair of ocular windows 12 and 13 are formed in correspondence to the user's left and right eyes, respectively, so as to allow the user to observe an image display part shown in FIGS. 3 and 4, which is provided in the ocular part 10, through a glass plate 11 fixed to the ocular windows 12 and 13.

A left audio output section 14 is provided on the left side of the left ocular window 12, while a right audio output section 15 is provided on the right side of the right ocular window 13. Also, a sensing window 16 for detecting that the user is looking in through the ocular windows 12 and 13 is provided between the two ocular windows 12, 13. Because of the sensing window 16, when the user's forehead gets closer thereto with a specified distance therebetween, a sensor provided inside the image observation apparatus body 1 detects the fact. The reference numeral 18 indicates an lighting window which is provided in a top surface 10b of the ocular part 10.

On an operational surface 20a of the operation part 20 are formed a pair of recesses 22 extending from both right and left ends toward the center generally on a mid-height position of the image observation apparatus body 1. The recesses 22 allows the user to hold the image observation apparatus body 1 by fitting the thumbs of both hands of the user onto these recesses 22 and by applying the rest of the fingers to the rear of the operation part 20. The operational surface 20a has a variety of functional buttons arranged thereon. A reference numeral 23 denotes a linkage changeover switch for selecting whether or not the image-taking direction of the camera is changed in linkage with changes in posture of the image observation apparatus body 1; 24 denotes a zoom-in button for zooming in an image; and 25 denotes a zoom-out button for zooming out the image. A reference numeral 26 denotes an image-direction changing button which is used for manually changing the direction of the image; 27 denotes a pair of manual focusing buttons for manually focusing the image; 28 denotes a focusing-mode changeover switch for changing over between an auto-focusing mode and a manual focusing mode; and 29 denotes memory buttons for memorizing several parameters concerning image display (e.g. image-taking direction of the camera, focal length and focused state of the lens).

Although FIG. 1 shows an example in which the linkage changeover switch 23 is provided, the image observation apparatus body may alternatively be arranged so that the image direction is basically linked with the posture of the image observation apparatus body 1, without providing the switch 23.

Figure 2:
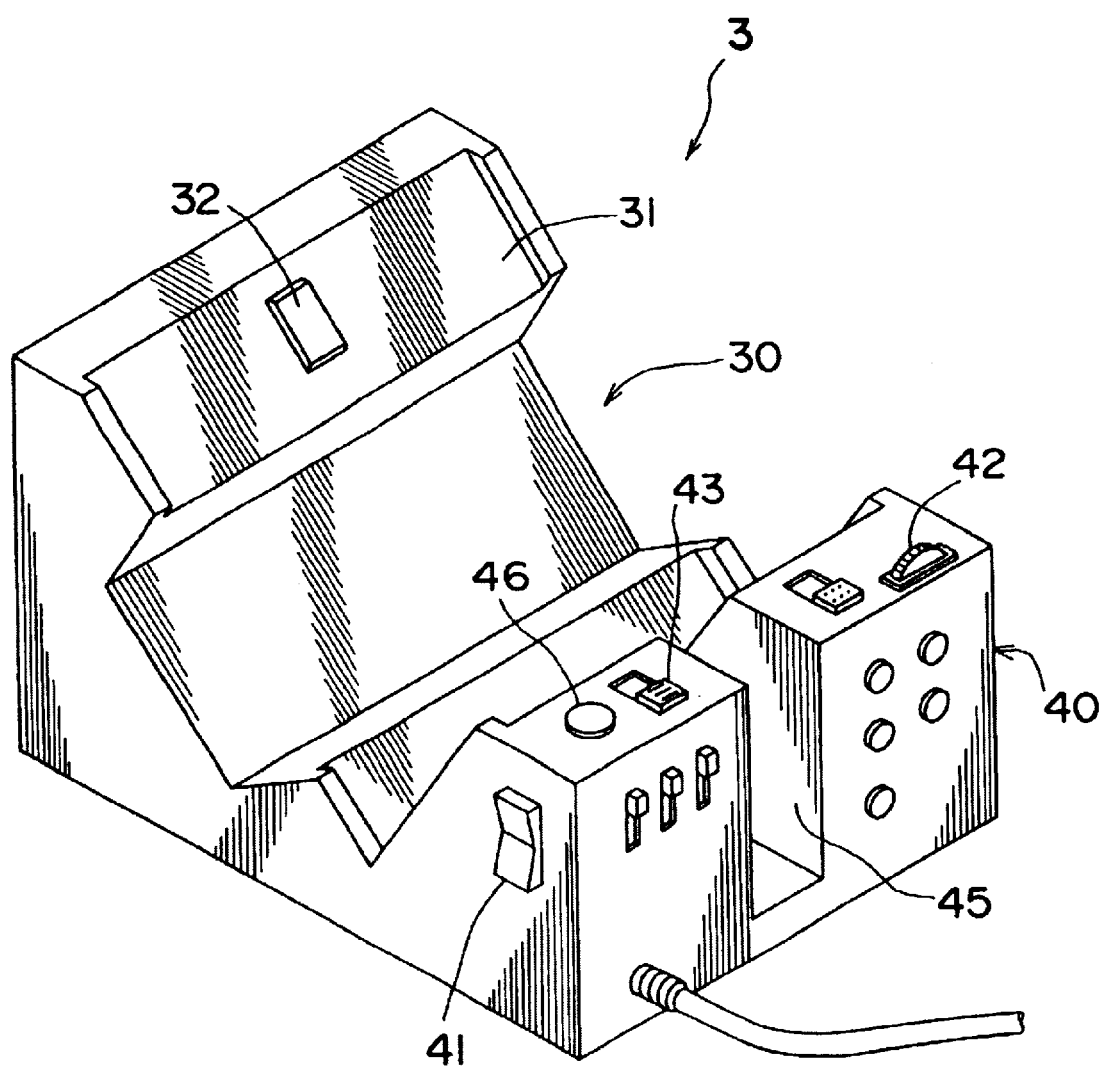
FIG. 2 is a perspective view showing a rest block or resting device for placing thereon the image observation apparatus body of FIG. 1 when the image observation apparatus body is not used.

FIG. 2 is a perspective view showing a rest block or resting device 3 for placing thereon the image observation apparatus body 1 when the apparatus body 1 is not used for observation. This rest block 3 comprises a rest part 30, which is formed into a generally V shape in its side view, for resting the image observation apparatus body 1 on the sloping surface thereof, and an operation part 40 which is formed on the fore side (front side) of the rest part 30. The rest part 30 is so arranged that when the image observation apparatus body 1 is rested thereon, the rear surface of the ocular part 10 (a surface opposite to the ocular surface 10a shown in FIG. 1) of the image observation apparatus body 1 comes into contact with a sloping surface 31 of the rest block 3. Also, on this sloping surface 31, is provided a rest sensing switch 32 for detecting that the image observation apparatus body 1 is rested or situated on the rest block 3. This switch 32 is normally projected from the sloping surface 31 of the rest block 3 with its contact being off, whereas the contact is turned on when the rest sensing switch 32 is pushed in the sloping surface 31.

A power supply for supplying electric power to the image observation apparatus body 1 is housed inside this rest block 3, and a power supply switch 41 is provided on the operation part 40. Also on this operation part 40, there are arranged a sound volume dial 42 for adjusting the output sound volume of the audio output sections 14, 15 of the image observation apparatus body 1, an initial-setting registration switch 43 for setting various parameters such as an image-taking direction of the camera and a focal length of the photographing lens, an initial-setting call-out switch 44 for retrieving the various parameters registered as initial settings, and other various kinds of operation switches.

In addition, on the central portion of the operation part 40 is formed a recess 45 for allowing the cord of the image observation apparatus body 1 to pass therethrough when the image observation apparatus body 1 is placed on the rest block 3. In this way, the power supply and the various kinds of operation switches are provided in the rest block 3, with the construction of which the image observation apparatus body 1, held by the user's hand for its operation, is reduced in size and weight.

FIG. 3 is a block diagram showing the control system of the image observation apparatus. The image observation apparatus body 1 and the image forming apparatus 2 having the camera 204 are equipped with signal transmitters 101, 201 and signal receivers 102, 202, respectively, for transmission and reception of signals therebetween. An operation unit 103 is connected to the signal transmitter 101 of the image observation apparatus body 1, and an eye access detector 104 and a posture detector 105 are connected to the operation unit 103. The posture detector 105 functions to detect the posture (position and direction), of the image observation apparatus body 1, which changes as the user's head moves with the eye access state in which the user's eyes approach the sensing window 16 thereof. The posture detector 105 has a position sensor, an angular velocity sensor, or the like. Also, to the signal receiver 102 of the image observation apparatus body 1 is connected an image display part 106 that allows the user to observe the image through the ocular windows 12, 13.

An image-taking direction controller 203 and the camera 204 are connected between the signal receiver 202 and the signal transmitter 201 of the image forming apparatus 2. A signal of the position and direction of the image observation apparatus body 1, the signal having been processed by the operation unit 103 of the image observation apparatus body 1, is transmitted from the signal transmitter 101 of the image observation apparatus body 1 to the image-taking direction controller 203 via the signal receiver 202 of the image forming apparatus 2, so that the image-taking direction of the camera 204 is controlled by the controller 203. Also, the image that is being taken by the camera 204 is transmitted from the signal transmitter 201 of the image forming apparatus 2 via the signal receiver 102 of the image observation apparatus body 1 to the image display part 106 where the image displayed is observed by the user through the ocular windows 12, 13.

Alternatively, the image observation apparatus body 1 may be connected to the image forming apparatus 2a having a computer graphic device, instead of having the camera, as shown in FIG. 4. As shown in the figure, the image forming apparatus 2a comprises a signal transmitter 211, a signal receiver 212 and a computer 213. The image observation apparatus body 1 has the same construction as that of the image observation apparatus body shown in FIG. 3; therefore, the description of its details is omitted.

In the construction of FIG. 4, a detection signal of the position and direction of the image observation apparatus body 1 is transmitted to the image forming apparatus 2a so that the image is changed by the computer 213, as required, in compliance with the signal, while the image is displayed by the image display part 106 of the image observation apparatus body 1.

Next, the method to control the image observation apparatus is described below with reference to the flow charts of FIGS. 5, 6 and 7.

Figure 5:
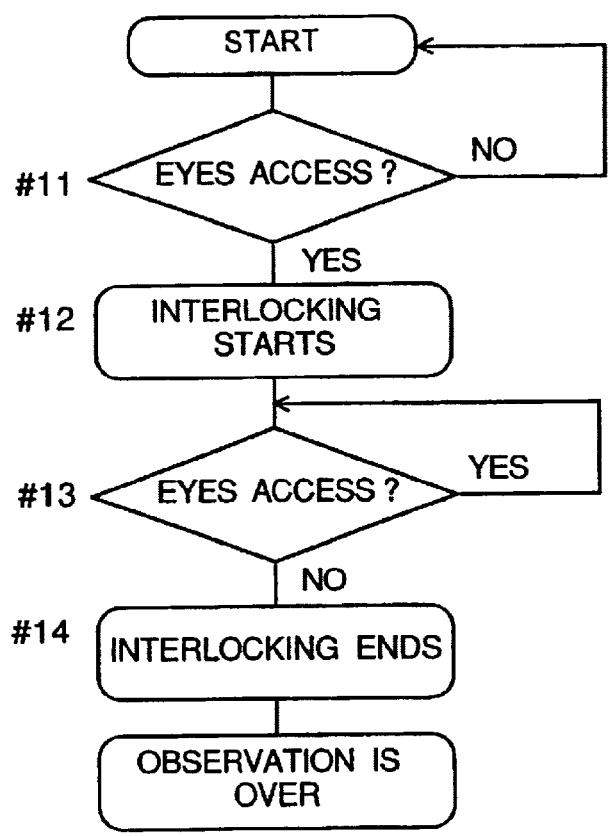
FIG. 5 is a flow chart showing a first control method of the image observation apparatus according to the first embodiment.

FIG. 5 illustrates a first control method. This first control method applies to a case in which the image observation apparatus body 1 is not equipped with the linkage changeover switch 23 for changing the on/off state of the linkage between the posture of the image observation apparatus body 1 and the image direction of the image forming apparatus.

First, at step #11, it is decided whether or not the user approaches his/her eyes to the ocular windows 12 and 13. If the user approaches his/her eyes to the ocular windows 12 and 13, the program goes to step #12 in which it starts linking between a change in the posture of the image observation apparatus body 1 and a change in the image direction. That is, the image direction is not changed unless the user approaches his/her eyes to the ocular windows 12 and 13. Therefore, the image-taking direction of the camera is not changed, or the computer does not perform the processing of image data, until the user approaches his/her eyes to the ocular windows 12 and 13, even if the image observation apparatus body 1 is moved.

Once the linking operation is started, it is subsequently decided at step #13 whether or not the user still approaches his/her eyes to the ocular windows 12 and 13. As far as the user approaches his/her eyes to the ocular windows 12 and 13, the linkage operation is continuously performed. However, if it is not detected that the user approaches his/her eyes to the ocular windows 12 and 13, the linkage between the change in the posture of the image observation apparatus body 1 and the changeover of the image is canceled at step #14. In other words, the image observation apparatus 1 is so arranged that the image is not changed over unnecessarily, for example when the apparatus body 1 is placed on the rest block 3 after the user finishes the observation of the image.

As explained above, with the above constitution or mechanism, unless the user approaches his/her eyes to the ocular windows 12 and 13, it does not link between the posture of the image observation apparatus body 1 and the image, so that the image is not changed unnecessarily. As a result, the possibility that the durability of the image-taking direction controller may be impaired is eliminated in the case where the camera 204 is used as the image forming apparatus 2, or the occurrence of such a problem as a misalignment between the direction of the image and the direction of the user's head due to a cumulative error in arithmetic operation is prevented in the case where the computer 213 is used as the image forming apparatus 2a.

Figure 6:
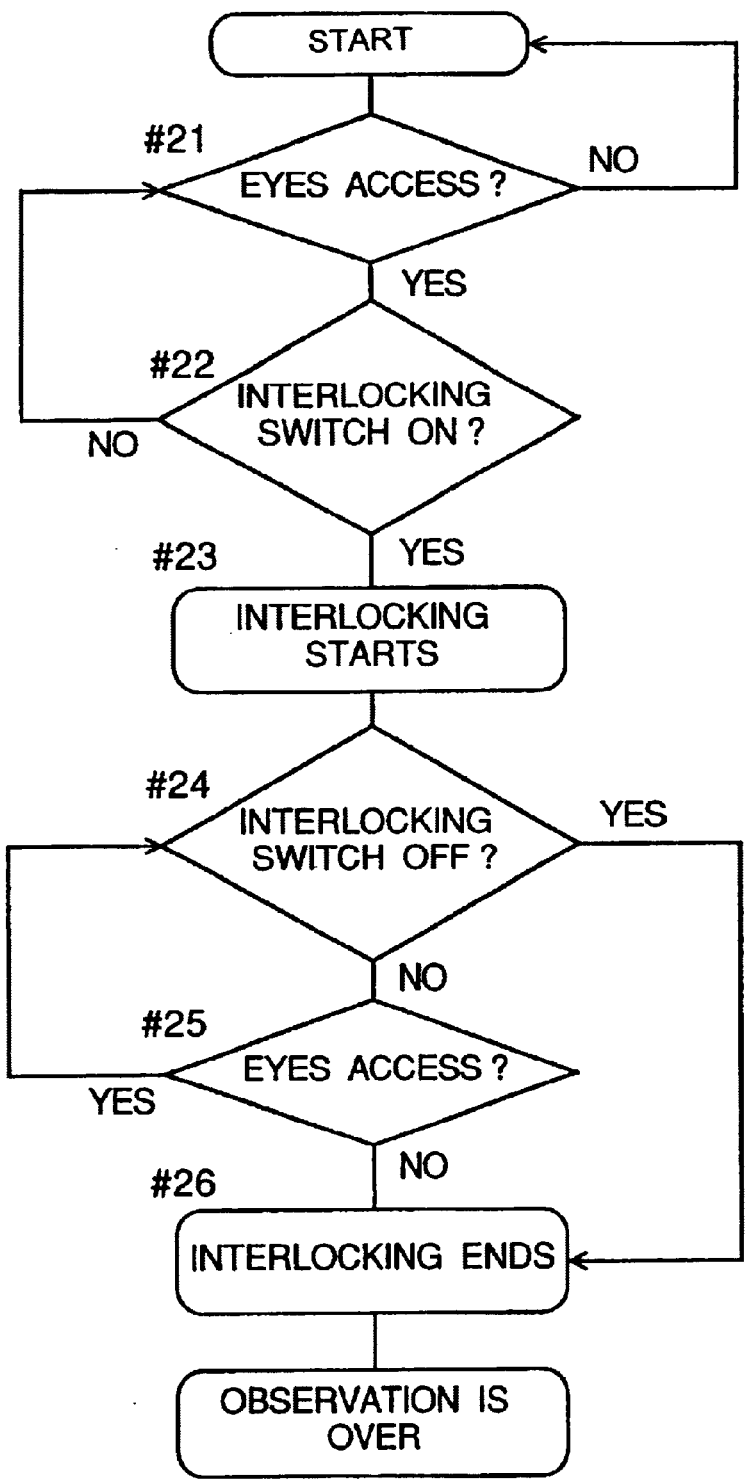
FIG. 6 is a flow chart showing a second control method of the image observation apparatus according to the first embodiment.

FIG. 6 is a flow chart showing a second control method. This control method applies to the case where the image observation apparatus body 1 is equipped with the linkage changeover switch 23 as shown in FIG. 1.

According to the method, first, at step #21, it is decided whether or not the user approaches his/her eyes to the ocular windows 12 and 13. If the user approaches his/her eyes to the ocular windows 12 and 13, it is decided at step #22 whether or not the linkage changeover switch 23 has been turned on. Then, only if the state in which the user approaches his/her eyes to the ocular windows 12 and 13, and the on-state of the linkage changeover switch 23 have been confirmed in this order, it starts linking between a change in the posture of the image observation apparatus body 1 and a change in the image direction at step #23. In this method, the linkage changeover switch 23 can not be turned on, even if operated, before the user approaches his/her eyes to the ocular windows 12 and 13. Therefore, even if the linkage changeover switch 23 is operated before the eye access state, it does not start linking therebetween. In this case, therefore, the linkage changeover switch 23 needs to be operated once again so as to be turned on. As a result, the image is not changed by any motion or movement of the image observation apparatus body 1, during a period from time when the user holds the apparatus body 1 in hand to time when the user approaches his/her eyes to the ocular windows 12 and 13. Therefore, the image at time of starting the observation never goes out of alignment with the direction of the user's head even if the user first operates the linkage changeover switch 23 at the time of starting the observation.

Once the linkage is started, it is decided at step #24 whether or not the linkage changeover switch 23 is turned off. If the switch 23 remains in the on-state, it is again decided at step #25 whether or not the user approaches his/her eyes to the ocular windows 12 and 13. If the user approaches his/her eyes to the ocular windows 12 and 13, the program returns to step #24. Meanwhile, if it is detected at step #25 that the user does not approach his/her eyes thereto, the program goes to step #26 in which the interlocking operation ends. Meanwhile, when it is detected at step #24 that the linkage changeover switch 23 is turned off, the program also goes to step #26 where the linkage stops. That is, when the linkage changeover switch 23 is turned off, the linkage immediately stops, and even if the linkage changeover switch 23 is on, the linkage stops when the user's eyes are away from the image observation apparatus 1. As a result, useless changeover of the image is not carried out upon finishing the observation.

Figure 7:
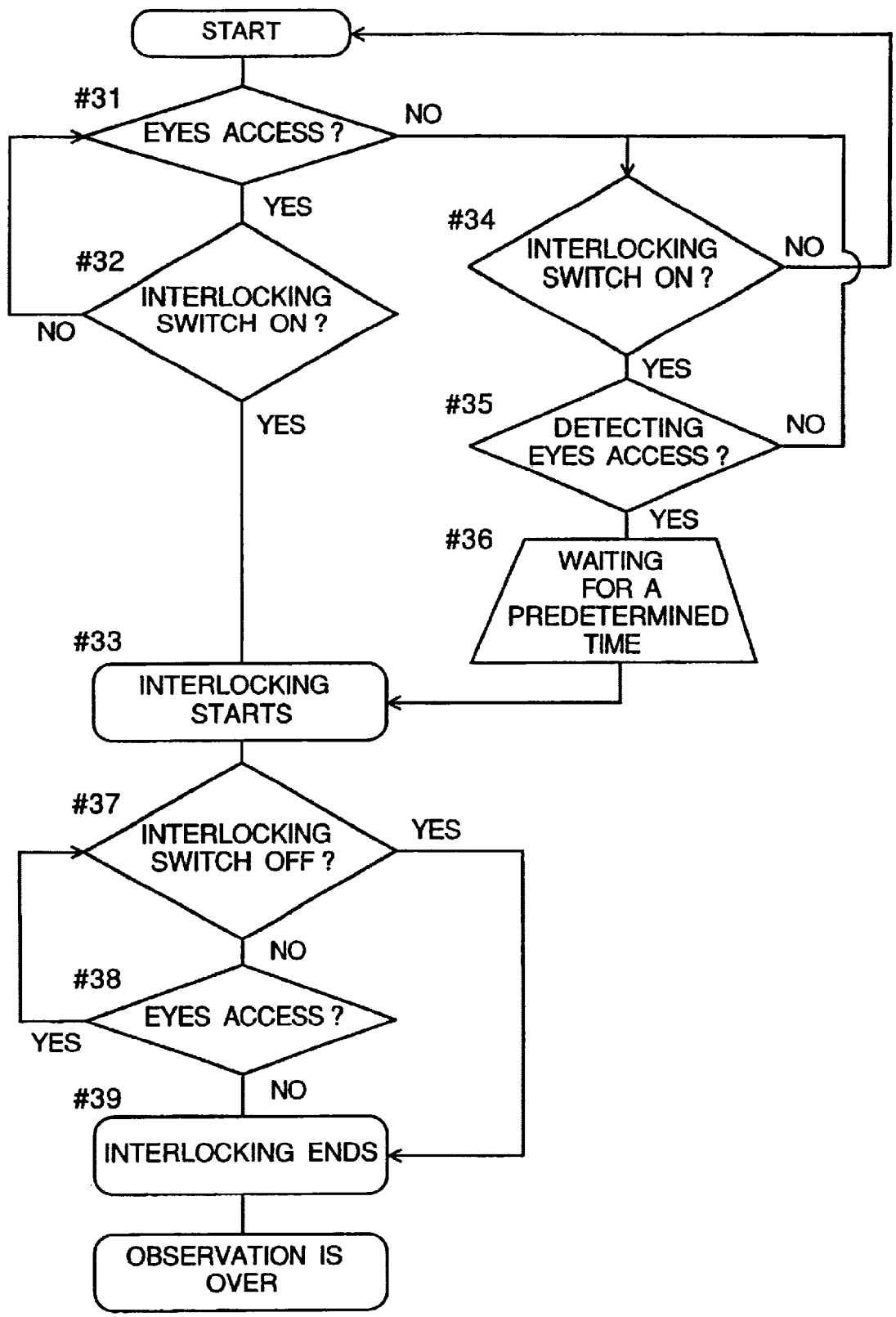
FIG. 7 is a flow chart showing a third control method of the image observation apparatus according to the first embodiment.

FIG. 7 is a flow chart showing a third control method. First, at step #31, it is decided whether or not the user approaches his/her eyes to the ocular windows 12 and 13. If the user approaches his/her eyes to the ocular windows 12 and 13, it is further decided at step #32 whether or not the linkage changeover switch 23 is turned on. Then, if it is detected that the switch 23 is off, the program returns to step #31. Meanwhile, only if the linkage changeover switch 23 is turned on, the program goes to step #33 where the linkage is started. The operation performed in these processes is the same as the controlling operation shown in the flow chart of FIG. 6.

On the other hand, if it is decided at step #31 that the user does not approach his/her eyes to the ocular windows 12 and 13, the program goes to step #34 where the state of the linkage changeover switch 23 is detected. As a result, if it is decided that the linkage changeover switch 23 is off, i.e., if the user does not approach his/her eyes to the ocular windows 12 and 13 while the linkage changeover switch 23 is not turned on yet, then the decision of step #31 is done once again.

If it is detected at step #34 that the linkage changeover switch 23 is on, it is detected at step #35 whether or not the user approaches his/her eyes to the ocular windows 12 and 13. If the user does not approach his/her eyes thereto, the program returns to step #34. Meanwhile, if the user approaches his/her eyes to the ocular windows 12 and 13, i.e., if the linkage changeover switch 23 is turned on before the user approaches his/her eyes thereto, the program stands by for a specified time at step #36 and then goes to the linkage-starting step of step #33. In this way, a time lag is set so that the linkage does not start immediately after the linkage changeover switch 23 is turned on. With the operation in which the time lag is set appropriately (1 to 2 seconds), even if the user at time of starting the observation first turns on the linkage changeover switch 23 before the user approaches his/her eyes to the ocular windows 12 and 13, the linkage does not start until the user is fully ready to observe the image.

After the linkage is started at step #33, the same controlling procedures as taken in the steps #24 to #26 of the flow chart of FIG. 6 are carried out at steps #37 to #39. That is, after the interlocking operation starts, it is decided at step #37 whether or not the linkage changeover switch 23 is turned off. If the switch remains on, it is detected at step #38 whether or not the user approaches his/her eyes to the ocular windows 12 and 13. If the user approaches his/her eyes thereto, the program returns to step #37. On the other hand, if the user does not approach his/her eyes to the ocular windows 12 and 13, the linkage stops at step #39. Also when it is detected at step #37 that the linkage changeover switch 23 is turned off, the program goes to step #39 where the linkage stops.

That is, also in this operation, the linkage stops immediately when the linkage changeover switch 23 is turned off, and the linkage stops when the user's eyes are away from the image observation apparatus body even if the linkage changeover switch 23 is on. Consequently, useless changeovers of the image are not carried out at time of finishing the observation.

Figure 8:
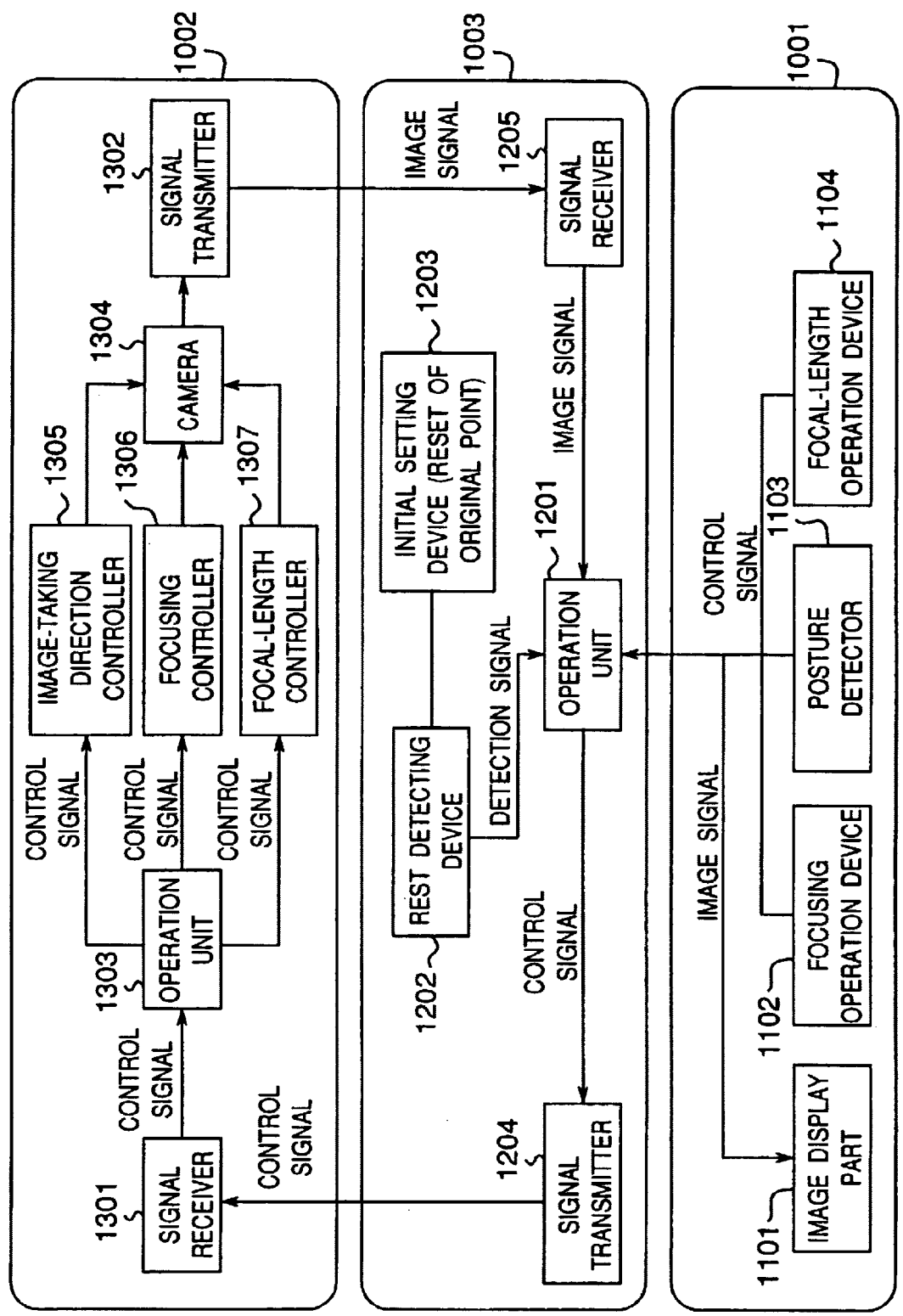
FIG. 8 is a block diagram showing a control system for an image observation apparatus which has an image forming apparatus having a camera, a rest block which is connected to the image forming apparatus, and an image observation apparatus body which is connected to the rest block, according to a second embodiment.

Next, referring to FIGS. 8 through 10, the description is made below on the image observation apparatus according to the second embodiment.

The image observation apparatus body and its rest block of the second embodiment, have appearances similar to those of the first embodiment, respectively. FIG. 8 is a block diagram showing a control system of this image observation apparatus. An image observation apparatus body 1001 is connected to an image forming apparatus 1002 having a camera 1304 via a rest block 1003. The image observation apparatus body 1001 comprises an image display part 1101 for allowing the user to observe an image through the ocular windows 12, 13, a focusing operation device 1102 which is operated with an manual focusing button 27 for adjusting the focal point of the photographing lens of the camera, a posture detector 1103 for detecting the posture (position and direction) of the image observation apparatus body 1001 which changes as the user's head moves while the user approaches his/her eyes to the ocular windows 12 and 13, and focal-length operation device 1104 which is operated with the zoom-in button 24 and zoom-out button 25 for adjusting the focal length of the photographing lens. The posture detector 1103 is constituted by a position sensor for detecting a position, an angular velocity sensor for detecting an angular velocity, or the like.

The rest block 1003 has an operation unit 1201 for receiving signals from the focusing operation device 1102, the posture detector 1103 and the focal-length operation device 1104 and for controlling the image display in the image display part 1101. To this operation unit 1201, are connected a rest detecting device 1202 which is switched between an on and off state by a rest sensing switch 32, and an initial setting device 1203 which has an initial-setting registration switch 43 and the initial-setting call-out switch 44. Also, the operation unit 1201 is connected to both signal transmitter 1204 and signal receiver 1205, and the signal transmitter 1204 and the signal receiver 1205 are connected to a signal receiver 1301 of the image forming apparatus 1002 and the signal transmitter 1302 thereof, respectively.

The initial setting device 1203 also has a function of, in compliance with the then outputting signal from the posture detector 1103 of the image observation apparatus body 1001, resetting the position of the original position that serves as a standard position for the control by the operation unit 1201 to move the image generated by the image forming apparatus 1002 in response to the posture detected by the posture detector 1103.

An operation unit 1303 is connected to the signal receiver 1301 of the image forming apparatus 1002, while a camera 1304 is connected to the signal transmitter 1302. Between the operation unit 1303 and the camera 1304 are connected, in parallel, an image-taking direction controller 1305, a focusing controller 1306 and a focal-length controller 1307.

With this mechanism, the control for the image-taking direction, the focusing and the zooming of the camera 1304 is performed based on control signals output from the posture detector 1103, a focusing operation unit 1102 and a focal-length operation device 1104 of the image observation apparatus body 1001, while the image taken in this way is displayed by the image display part 1101 of the image observation apparatus body 1001, allowing the user to observe the image through the ocular windows 12, 13.

Although not shown in this block diagram, the image observation apparatus body 1001 also includes image-taking direction changing means for allowing the image-taking direction to be adjusted not only responsively to the position and direction of the image observation apparatus body 1001 detected by the posture detector 1103, but also manually by using the image-direction changing button 26, and includes linkage changeover means for switching between linkage and non-linkage of the posture of the image observation apparatus body 1001 with the image direction thereof.

Alternatively, a computer graphic device may be used as a part of the image forming apparatus 1002, instead of the camera 1304. A block diagram is shown in FIG. 9 in case that the computer graphic device 1313 is used therein.

According to the modification, the image forming apparatus 1002a is so arranged that a computer 1313 is connected between a signal receiver 1311 and a signal transmitter 1312, and an image storage device 1314 is connected to the computer 1313. Meanwhile, the image observation apparatus body 1001a comprises an image display part 1111, a posture detector 1112 and a magnification setting means 1113, all of which are connected to the operation unit 1201 of the rest block 1003a. As shown in FIG. 9, the rest block 1003a has a construction which is fundamentally similar to the one of the rest block 1003 illustrated in FIG. 8.

In addition, a changing device for allowing the image moving direction to be changed manually, and a linkage changeover device for switching between linkage and non-linkage of the image with the posture of the image observation apparatus body 1001a, are not shown. As described above, the rest block 1003a is substantially identical in construction to that shown in FIG. 8; therefore, the detailed explanation is omitted.

Figure 9:
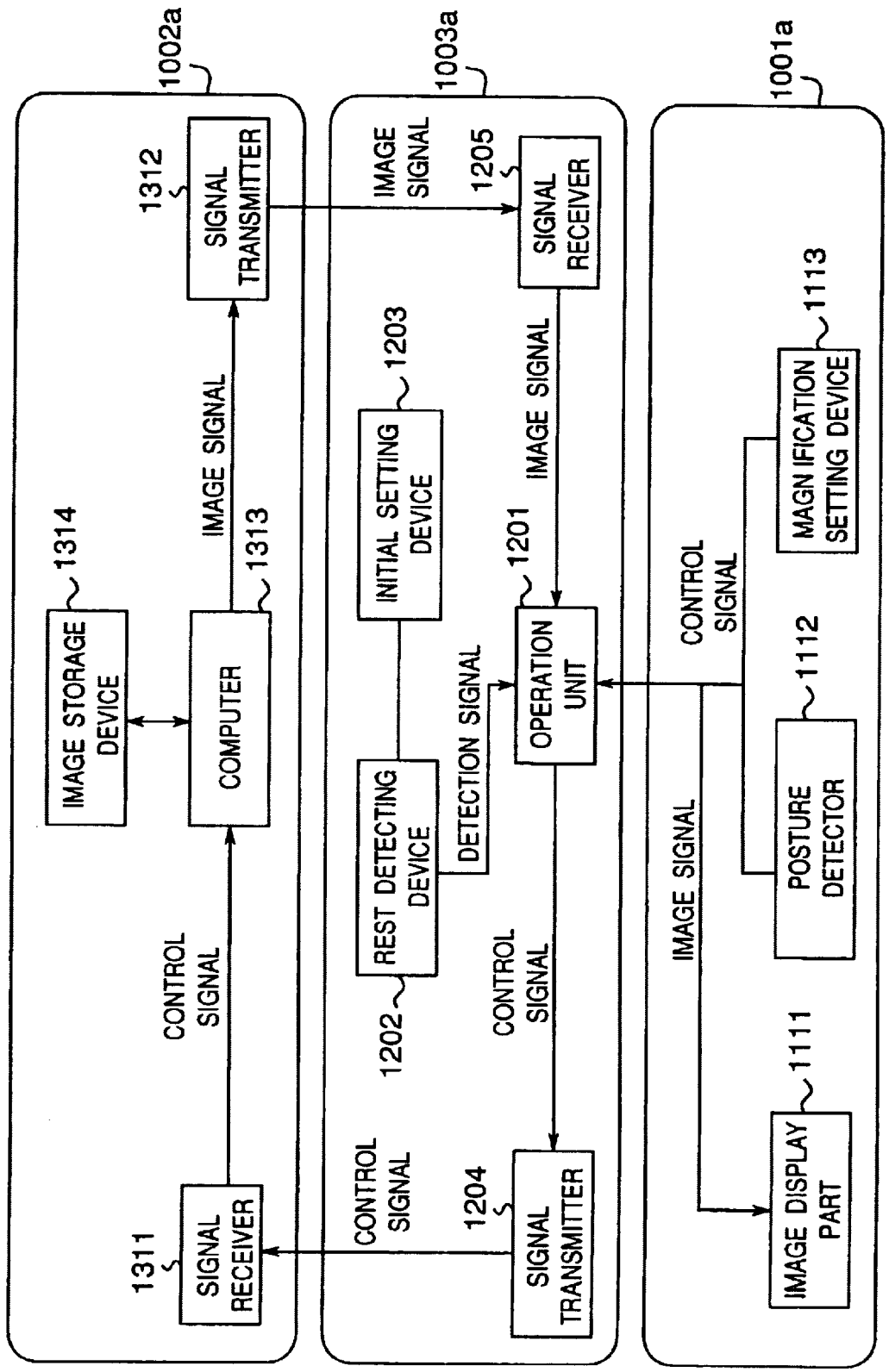
FIG. 9 is a block diagram showing a control system for an image observation apparatus which has an image forming apparatus having a computer, a rest block which is connected to the image forming apparatus, and an image observation apparatus body which is connected to the rest block, according to the second embodiment.
Figure 10:
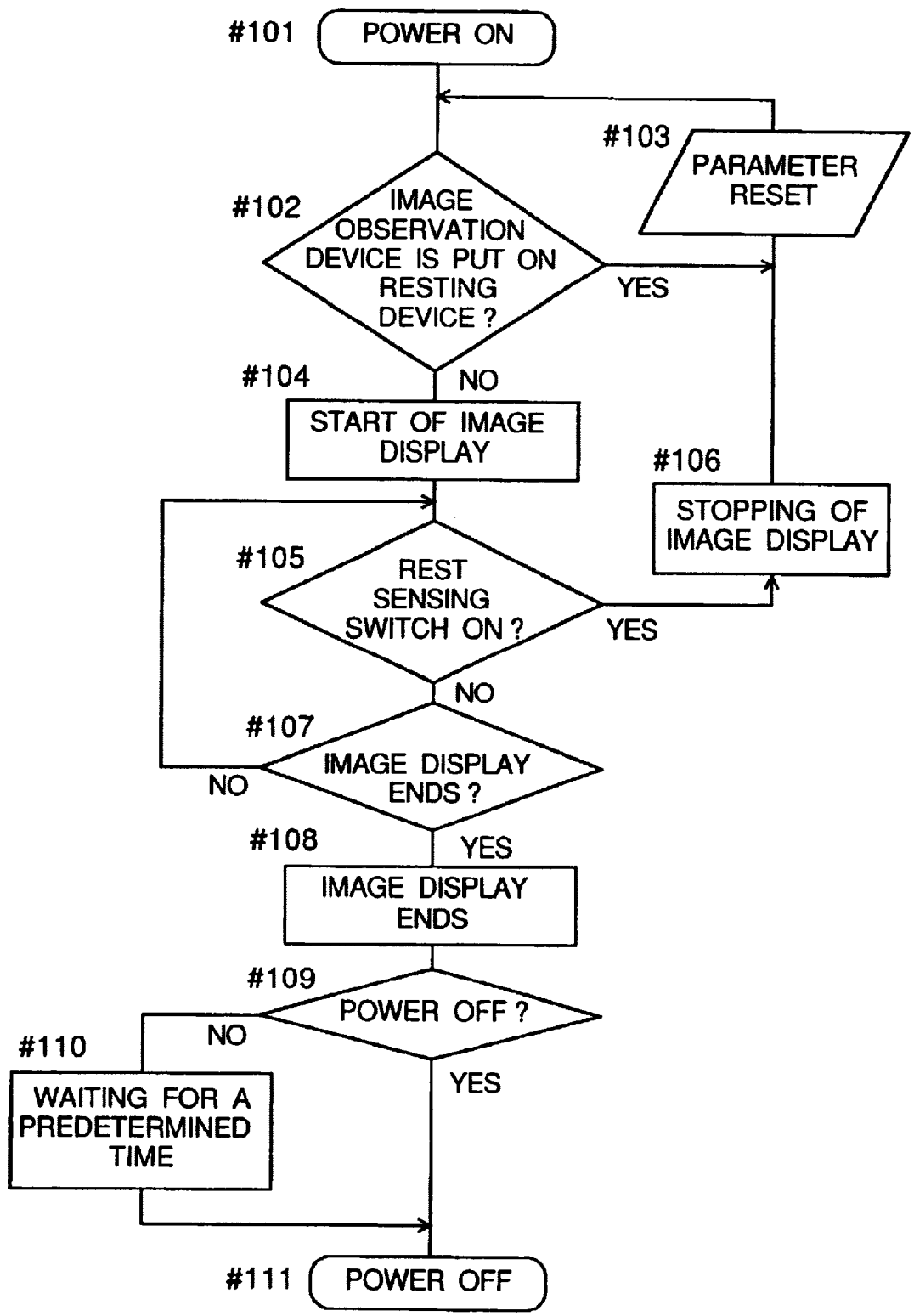
FIG. 10 is a flow chart showing a control method of the image observation apparatus according to the second embodiment.

According to the construction shown in FIG. 9, a signal representing detected position and direction of the image observation apparatus body 1001a and/or a signal representing the directivity of a manually operated image, or a signal representing the magnification for the image, are transmitted to the image forming apparatus 1002a so that the image is changed at any time, as required, in compliance with the signals while the resulting image is displayed on the image display part 1111 of the image observation apparatus body 1001*a*.

Next, the method to control this image observation apparatus is described with reference to the flow chart of FIG. 10.

First, if a power switch is turned on at step #101, the program goes to step #102 where it is decided whether or not the image observation apparatus body 1001 is set on the rest block 1003. If it is set thereon, the program goes to step #103 where the operation unit 1201 of the rest block 1003 resets the position of the image to the standard position of the image to be generated by the image forming apparatus 1002, on the basis of the parameters concerning the image-taking direction of the camera 1304 and the photographing lens as well as the signal output from the posture detector 1103. Next, the program goes back to step #102 where the above process is repeated.

On the other hand, if the image observation apparatus body 1001 is not set on the rest block 1002, the image display is started at step #104 without resetting the parameters. That is, if the image observation apparatus body 1001 is once put on the rest block 1003, the observation is started with an image generated from predetermined, constant parameters; meanwhile, if the image observation apparatus body 1001 is not put on the rest block 1003 (for example, if the observation is temporarily interrupted), the observation is restarted with the last image with which the observation ends before the resumption of the new observation.

When the image display starts, it is then decided at step #105 whether or not the rest sensing switch 32 is turned on. If it is turned on, the image display is stopped once at step #106, and then the program returns to step #103 where the parameters are reset and image display is resumed or restarted. That is, every time the rest sensing switch 32 is switched on, it is possible to observe the image which is set with the initial settings at any time. By the way, the step #106 of "STOPPING OF IMAGE DISPLAY" may not be provided, depending on circumstances.

If it is detected at step #105 that the rest sensing switch 32 is not turned on, it is detected at step #107 whether the image display is finished or not, based on whether the transmission of the image from the camera 1304 is stopped or continued. If the image display is not finished, the program returns to step #105. By the way, the end of the image display may be detected either by detecting that the user has stopped the observation of the image with the sensing window 16, or by operating a stop switch which is additionally provided thereon.

If the termination of the image display is detected at step #107, the program goes to step #108 where the image display is ended. And the program further goes to step #109 where it is detected whether or not the power supply switch 41A is turned off. If the power supply switch 41 is not turned off, the program goes to step #110 for waiting for a specified time, and then the power is shut off at step #111.

On the other hand, if the power supply switch 41 is turned off, the program moves from step #109 directly to step #111 where the power is cut off.

According to the mechanism, the image changes in linkage with motion or movement of the user's head or in linkage with operation of the functional buttons 24 to 27. Meanwhile, because various conditions on the side of the image forming apparatus are set to the initial conditions when the user comes to an end of the image observation and rests the image observation apparatus body on the rest block, an image gained which the user next observes with the image observation apparatus body in hand is generated based upon the constant conditions. As a result, disturbances for the user to possibly encounter can be prevented effectively.

Figure 11:
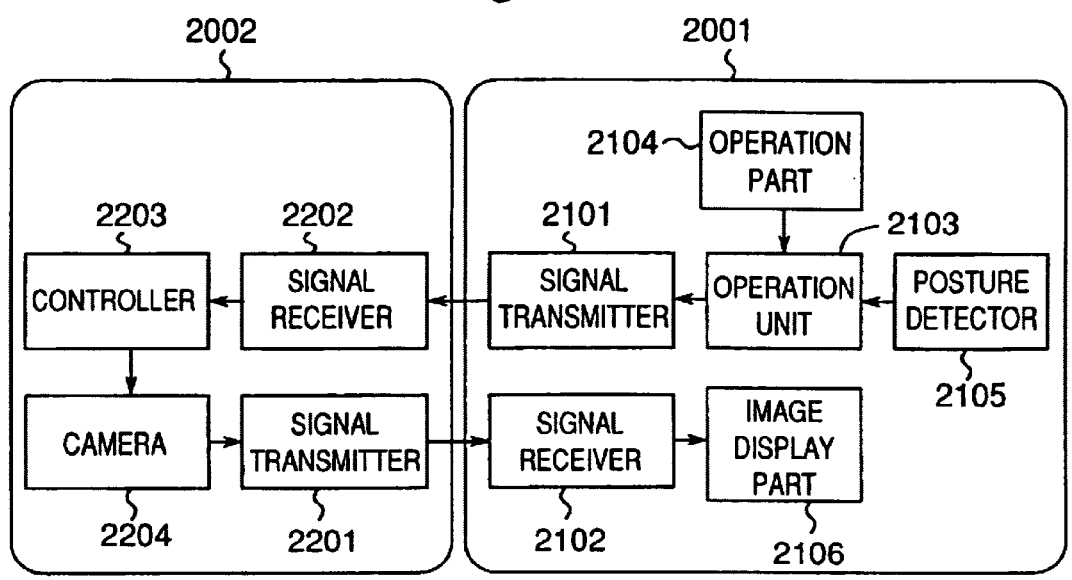
FIG. 11 is a block diagram showing a control system for an image observation apparatus which has an image forming apparatus having a camera and an image observation apparatus body which is connected to the image forming apparatus, according to a third embodiment.
Figure 12:
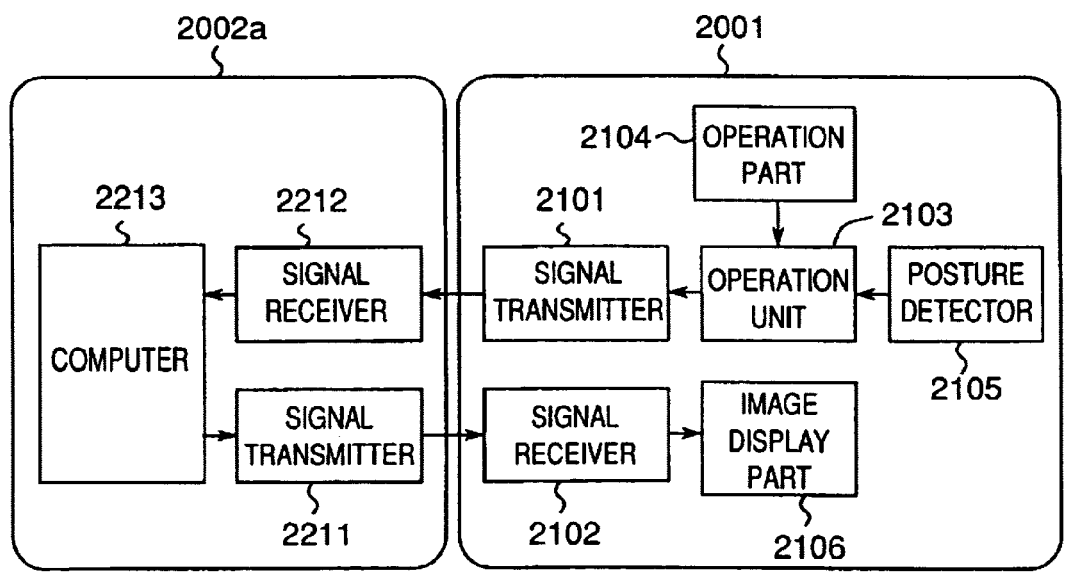
FIG. 12 is a block diagram showing a control system for an image observation apparatus which has an image forming apparatus having a computer and an image observation apparatus body which is connected to the image forming apparatus, according to the third embodiment.

Next, referring to FIGS. 11 through 13, the description is made below on the image observation apparatus according to the third embodiment.

The image observation apparatus body and its rest block of the third embodiment, have appearances similar to those of the first embodiment, respectively. FIG. 11 is a block diagram showing a control system of this image observation apparatus. The image observation apparatus body 2001 and the image forming apparatus 2002 having a camera 2204 are equipped with signal transmitters 2101 and 2201 and signal receivers 2102 and 2202, respectively, for transmitting and receiving signals therebetween. An operation unit 2103 is connected to the signal transmitter 2101 of the image observation apparatus body 2001, and an operation part 2104 and a posture detector 2105 are connected to the operation unit 2103. The operation part 2104 corresponds to various switches 24 to 28 for operating the camera 2204, and the posture detector 2105 is constituted by a position sensor, an angular velocity sensor or the like for detecting the posture (position and direction) of the image observation apparatus body 2001 that changes as the user's head moves while the user's eyes are approached to the ocular windows 12 and 13. Also, an image display part 2106 that allows the user to observe the image through the ocular windows 12, 13 is connected to the signal receiver 2102 of the image observation apparatus body 2001.

A control unit 2203 and the camera 2204 are connected between the signal receiver 2202 and the signal transmitter 2201 of the image forming apparatus 2002, from the side of the signal receiver 2202 to the side of the signal transmitter 2201.

With the mechanism, a signal, being processed in the operation unit 2103 of the image observation apparatus body 2001, of the position and direction of the image observation apparatus body 2001, and an operational signal, are transmitted from the signal transmitter 2101 of the image observation apparatus body 2001 to the control unit 2203 via the signal receiver 2202 of the image forming apparatus 2002, so that the camera 2204 is controlled by the controller 2203. On the other hand, the image that is being taken by the camera 2204 is transmitted from the signal transmitter 2201 of the image forming apparatus 2002 via the signal receiver 2102 of the image observation apparatus body 2001 to the image display part 2106. The image displayed on the image display part 2106 is observed by the user through the ocular windows 12, 13.

Alternatively, a computer graphic device may be used as a part of the image forming apparatus, instead of the camera 2204. A block diagram is shown in FIG. 12 in case that the computer graphic device 2213 is used therein.

The image forming apparatus 2002*a* comprises a signal transmitter 2211, a signal receiver 2212 and a computer 2213. The image observation apparatus body 2001 has the same construction or mechanism as that illustrated in FIG. 11; therefore, the detailed description is omitted. In the construction shown in FIG. 12, a detected signal concerning the position and direction of the image observation apparatus body 2001, and an operational signal, are transmitted to the image forming apparatus 2002*a* so that the image is changed by the computer 2213 at any time, as required, in compliance with those signals while the image is displayed on the image display part 2106 of the image observation apparatus body 2001.

Next, the method to control this image observation apparatus is described with reference to the flow chart of FIG. 13.

First, if the image observation is started at step #201, the program goes to step #202 where it is decided whether or not the linkage changeover switch 23 of the image observation apparatus body 2001 is turned on. If the linkage changeover switch 23 is detected to be turned on at the step, the program goes to step #203 where the image-taking direction of the camera starts to be controlled so that the image-taking direction of the camera changes in linkage with a change in the posture of the image observation apparatus body 2001.

Next, at step #204, it is decided whether or not the user operates the operation part 2104 (operation switches 24 to 28). If it is decided that the user does not operate the operation part 2104, it is decided at step #205 and #206 whether or not the user's eyes get close to the sensing window 16 (i.e. whether or not the user observes the image through the ocular windows 12 and 13), and it is decided whether or not the image observation ends.

Next, it is decided whether or not the linkage switch is turned off at step #206. And, if the observation does not end, and if the linkage switch is not turned off, the program returns to step #204 and repeat the above program.

On the other hand, if it is decided that image observation is over, the program jumps to step #209 where the controlling operation is ended.

If the image observation is not ended yet, and if the linkage switch is turned off, the linking operation is stopped at step #207. Next, it is decided again at step #208 whether or not the image observation is ended. If the image observation is ended, the controlling operation of this flow chart is ended at step #209, while if the image observation is not ended, the program returns to step #202 and the controlling operation continues.

If it is detected at step #202 that the linkage switch 23 is not turned on yet after the image observation is detected to start at step #201, the program stands by for a specified time at step #210 and then jumps to step #208 where it is decided whether or not the image observation is over. If the image observation is not over, the program returns to step #202. That is, the operations of steps #202, #210 and #208 are repeated as far as the linkage switch 23 is not turned on at time of the image observation, during which the program waits for the linkage changeover switch 23 to be switched on.

Meanwhile, when it is detected at step #204 that the operation part 2104 of the image observation apparatus body 2001 is operated after the linking operation is started at step #203, the linkage is stopped at step #211 so that the image does not change. Next, after the program stands by for a specified time at step #212, it is decided again at step #213 whether or not the operation part 2104 is operated. If it is decided that the operation part is operated, the program returns to step #212 again where the program stands by for a specified time and then executes step #213. On the other hand, if the operation part 2104 is not operated, the program returns to step #203 where the linking operation is resumed.

As apparent from the above explanation, according to the above mechanism, the image is changed in linkage with a change in posture of the image observation apparatus body 2001; meanwhile, the linking operation is stopped at time of operating the operation part 2104. Therefore, even if the image observation apparatus body 2001 moves along with motion or movement of the user's hands during the operation, the image itself does not change. As a result, any unintentional image control which may be caused by any slight movement of the image observation apparatus body 2001 held by the user during the operation of the operation part 2104, is surely prevented; thus, preventing the image from blurring or moving or swinging carelessly during observation of the image.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image observation apparatus comprising:
   a main body which has an image display device;
   an operational member which is provided on the main body and which is operated manually in order to give an instruction to the image observation apparatus;
   a detector for detecting a posture of the main body; and
   a controller for controlling an image which is displayed on the image display device in response to a signal which is output from the detector,
   wherein the controller does not allow changing the image which is displayed on the image display device in response to the signal which is output from the detector when the operational member is operated.

2. The image observation apparatus as claimed in claim 1, further comprising a camera which forms the image which is displayed on the image display device,
   wherein the controller controls the image which is displayed thereon by controlling a posture of the camera.

3. The image observation apparatus as claimed in claim 2, wherein the operational member is used for adjusting at least one of the posture, a focal length and a focus of the camera.

4. The image observation apparatus as claimed in claim 1, further comprising an image forming device which forms the image which is displayed on the image display device,
   wherein the controller controls the image which is displayed on the image display device by operating image data which are output from the image forming device.

5. An image observation apparatus comprising:
   a main body which has an image display device;
   a first detector which is provided in the main body and which detects that a user observes an image being displayed on the image display device;
   a second detector which detects a posture of the main body; and
   a controller which controls the image being displayed on the image display device in response to a signal which is output from the second detector,
   wherein the controller does not allow changing the image being displayed on the image display device in response to the signal which is output from the second detector when the first detector detects that the user does not observe the image being displayed on the image display device.

6. The image observation apparatus as claimed in claim 5, further comprising an instruction device for allowing and prohibiting said changing of the image by the controller,
   wherein the controller allows changing the image being displayed on the image display device only when the first detector detects that the user observes the image on the image display device and only when said changing of the image by the controller is allowed by the instruction device.

7. The image observation apparatus as claimed in claim 6, wherein the first detector detects whether the user observes the image on the image display device or not before said changing of the image by the controller is allowed by the instruction device.

8. The image observation apparatus as claimed in claim 6, wherein the first detector detects whether the user observes the image on the image display device or not before said changing of the image by the controller is allowed by the instruction device, wherein when the first detector detects that the user does not observe the image on the image display device, first, the instruction device is enabled to allow said changing of the image by the controller, next, the first detector detects that the user observes the image on the image display device, and next, the controller starts to allow changing the image on the image display device after a predetermined time lapses.

9. The image observation apparatus as claimed in claim 5, further comprising a camera which forms the image which is displayed on the image display device, wherein the controller controls the image which is displayed on the image display device by controlling a posture of the camera.

10. The image observation apparatus as claimed in claim 9, further comprising an operational member which is for adjusting at least one of the posture, a focal length and a focus of the camera.

11. The image observation apparatus as claimed in claim 5, further comprising an image generating device which generates the image being displayed on the image display device, wherein the controller controls the image which is displayed on the image display device by operating image data which are output from the image generating device.

12. The image observation apparatus as claimed in claim 5, wherein the main body is configured to be held in the user's hands when the user observes the image being displayed on the image display device.

13. An image observation apparatus comprising:

a main body which has an image display device;

a controller for controlling the image observation apparatus; and a first detector for detecting whether a user stops observing an image which is displayed on the image display device or not, wherein the controller sets at least one setting condition of the image observation apparatus to a predetermined condition such that the image which is displayed on the image display device is not allowed to change when the first detector detects that the user stops observing the image.

14. The image observation apparatus as claimed in claim 13, further comprising a rest on which the main body is put, wherein a rest detector detects whether the main body is put on the rest or not.

15. The image observation apparatus as claimed in claim 13, further comprising a camera which forms the image being displayed on the image display device, wherein the predetermined condition includes at least one of a condition for a posture of the camera, a condition for a focal length thereof, and a condition for a focus thereof.

16. The image observation apparatus as claimed in claim 15, wherein the main body further comprises an operational member for controlling the camera.

17. The image observation apparatus as claimed in claim 13, further comprising an image producing device which produces the image being displayed on the image display device, wherein the setting condition comprises data which are used for an operation of the image producing device.

18. The image observation apparatus as claimed in claim 17, wherein the main body further comprises an operational member for controlling the image producing device.

19. The image observation apparatus as claimed in claim 13, further comprising a second detector for detecting a posture of the main body, wherein the controller controls the image being displayed on the image display device based upon a detecting signal which is output from the second detector.

20. The image observation apparatus as claimed in claim 19, wherein the controller resets a parameter to a predetermined value when the first detector detects that the user stops observing the image, said parameter being a parameter for controlling the image being displayed on the image display device on a basis of the detecting signal from the second detector.

21. The image observation apparatus as claimed in claim 13, wherein the image display device is reset to a predetermined image display condition.

22. The image observation apparatus as claimed in claim 13, wherein the main body is configured to be held in the user's hands when the user observes the image being displayed on the image display device.

23. An image observation apparatus comprising:

a main body which has an image display device, the main body being configured to be held in a user's hands when the user observes an image being displayed on the image display device;

an operational member which is provided on the main body and which is operated manually in order to give an instruction to the image observation apparatus;

a detector for detecting a posture of the main body; and a controller for controlling the image which is displayed on the image display device in response to a signal which is output from the detector, wherein the controller does not allow changing the image which is displayed on the image display device in response to the signal which is output from the detector when the operational member is operated.

24. The image observation apparatus as claimed in claim 23, further comprising a camera which forms the image which is displayed on the image display device, wherein the controller controls the image which is displayed thereon by controlling a posture of the camera.

25. An image observation apparatus comprising:

a main body which has an image display device;

an operational member which is provided on the main body and which is operated manually in order to give an instruction to the image observation apparatus to prevent circuitry which provides the image display device with context from changing the displayed image;

a detector for detecting a posture of the main body; and a controller for controlling the image which is displayed on the image display device in response to a signal which is output from the detector, wherein the controller does not allow changing the image which is displayed on the image display device in response to the signal which is output from the detector when the operational member is operated.

26. The image observation apparatus as claimed in claim 25, further comprising an image forming device which forms the image which is displayed on the image display device, wherein the controller controls the image which is displayed on the image display device by operating image data which are output from the image forming device.

* * * * *